Jan. 15, 1929.
A. D. WILLHAUCK
1,698,807
ABRADING MACHINE
Filed June 5, 1925     3 Sheets-Sheet 1
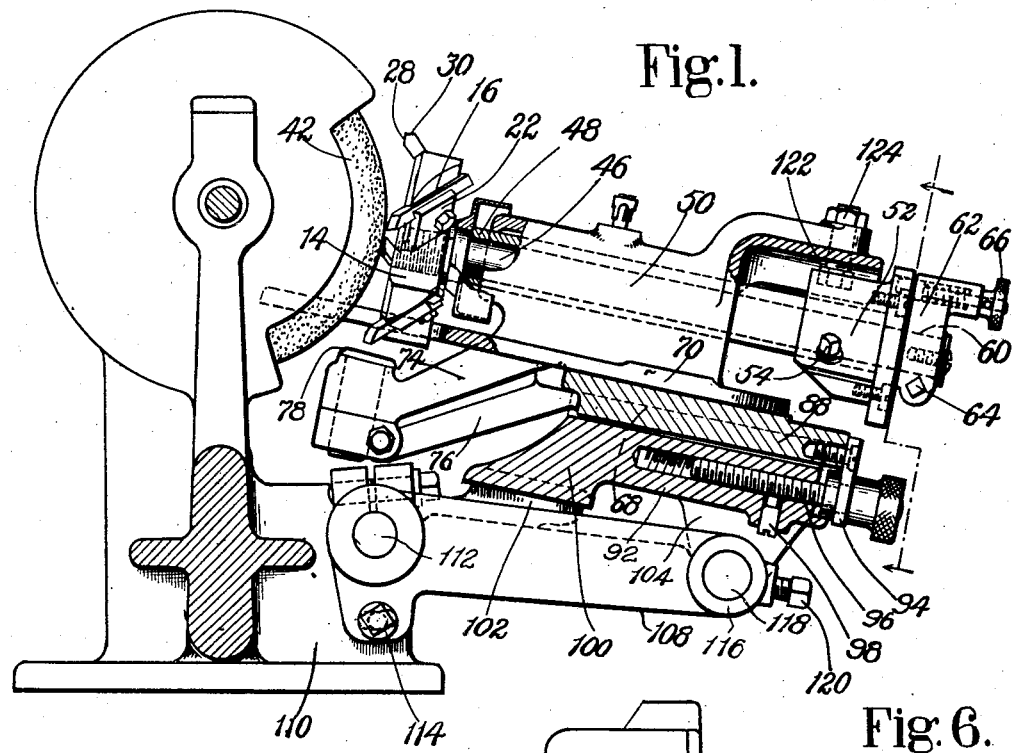
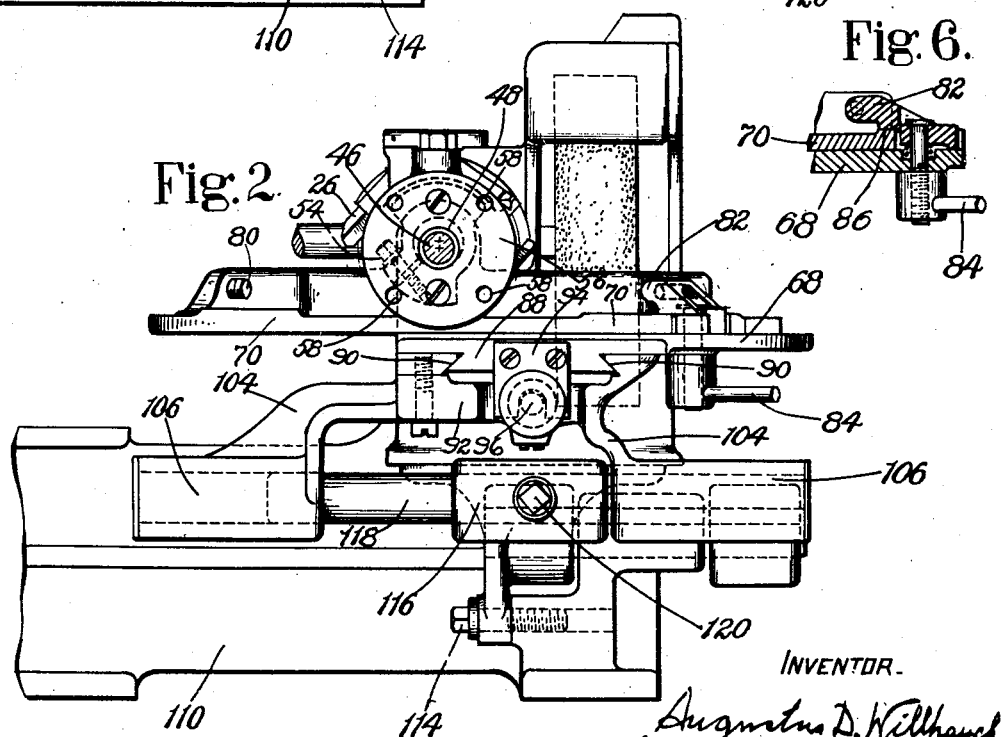
INVENTOR.
Augustus D. Willhauck
By his Attorney,
Nelson W. Howard

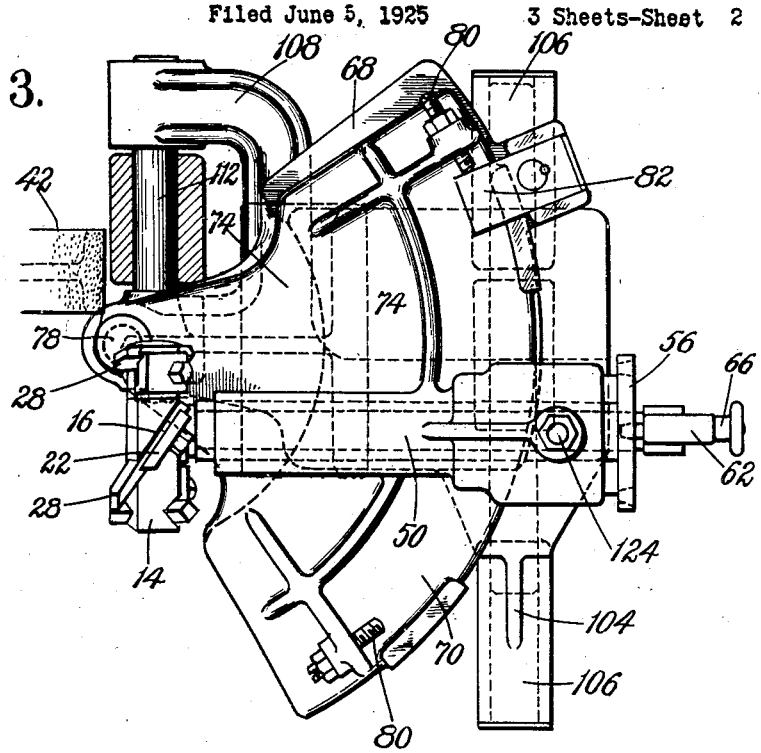
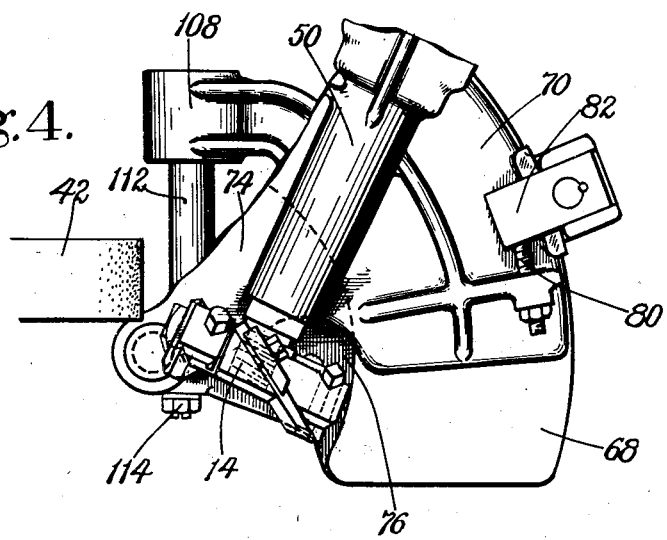

Jan. 15, 1929. 1,698,807
A. D. WILLHAUCK
ABRADING MACHINE
Filed June 5, 1925 3 Sheets-Sheet 3
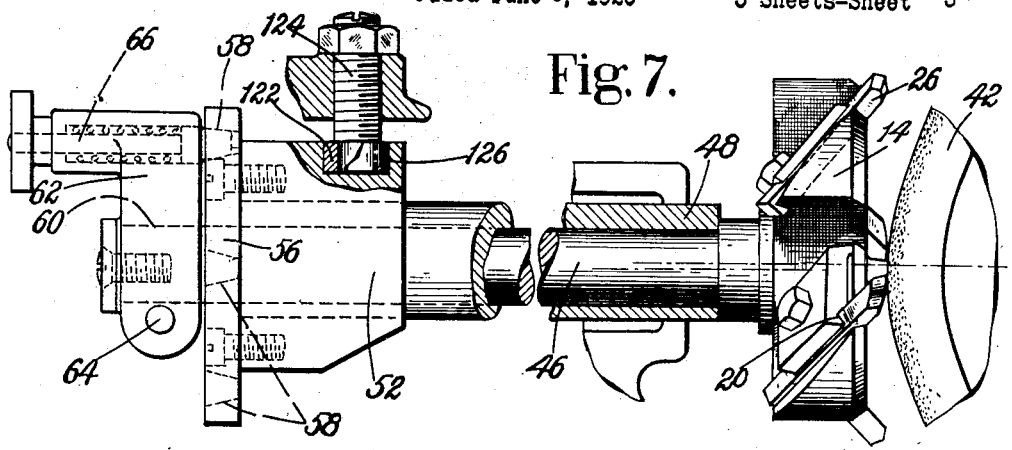
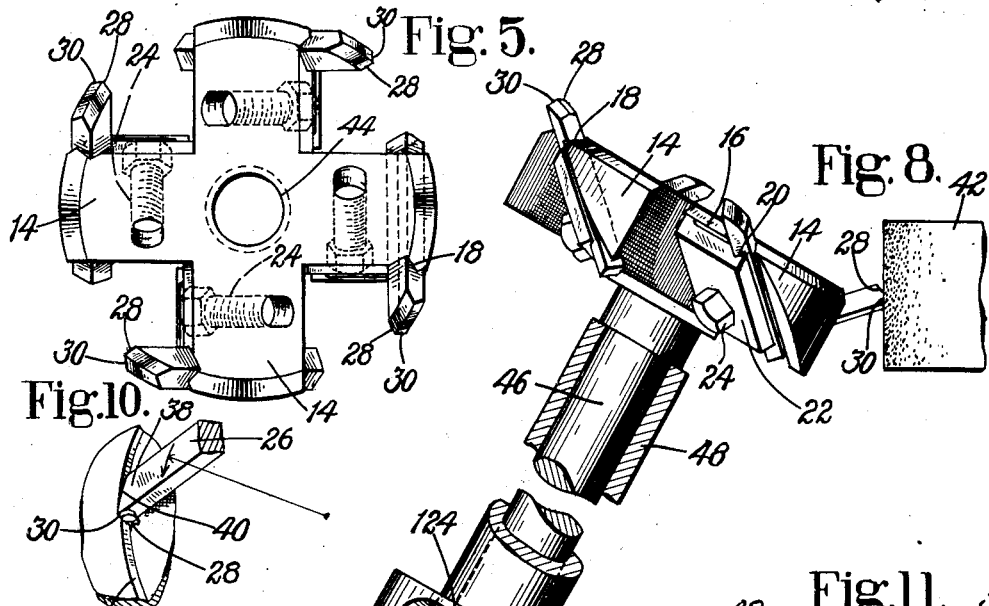
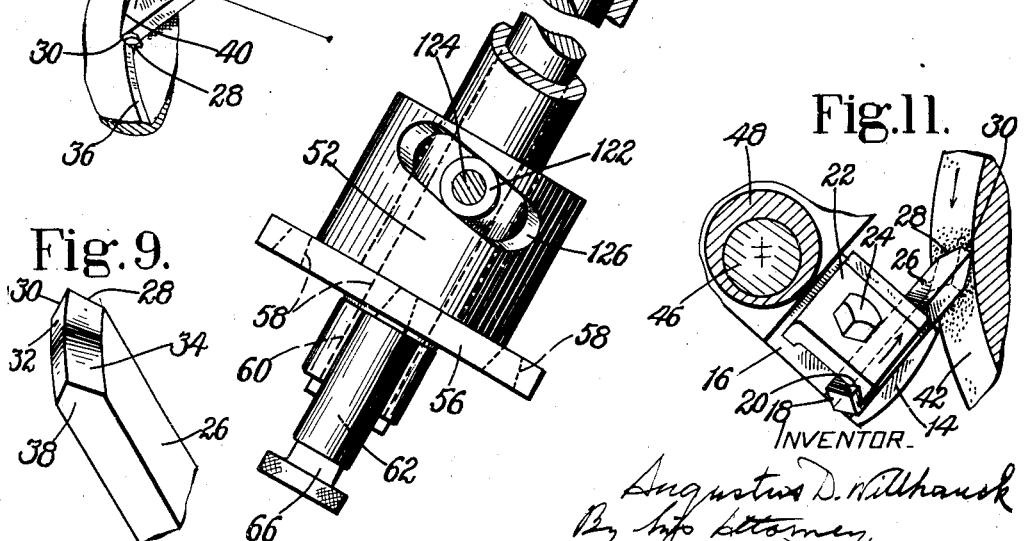
INVENTOR.
Augustus D. Willhauck
By his Attorney
Nelson W. Howard Patented Jan. 15, 1929.

1,698,807

UNITED STATES PATENT OFFICE.

AUGUSTUS D. WILLHAUCK, OF CAMBRIDGE, MASSACHUSETTS, ASSIGNOR TO UNITED SHOE MACHINERY CORPORATION, OF PATERSON, NEW JERSEY, A CORPORATION OF NEW JERSEY.

ABRADING MACHINE.

Application filed June 5, 1925. Serial No. 35,103.

This invention relates to abrading machines and is herein illustrated as embodied in a machine for grinding the blades of rotary cutters for use in block planer machines for refinishing the surfaces of cutting blocks. In various aspects, however, the invention is not limited to embodiment in abrading machines of the illustrated type or to use in grinding block planer cutters but may be employed in analogous organizations and be useful in similar abrading operations.

Rotary cutters of the type commonly employed in block planer machines, comprise a central head or body portion formed with a plurality of uniformly spaced radial arms each having a cutting tool or blade removably secured therein. The rotary cutter herein shown in connection with the illustrated abrading machine is of the general type above referred to and the individual cutting tools or blades consist of elongated steel bars of rectangular cross-section which are mounted in the cutter head with the longitudinal axis of each tool disposed at right angles to its supporting arm and inclined with respect to the plane of rotation of the cutter head in order that the tool shall be presented at an angle to the surface to be operated upon. The cutting extremity of each of the illustrated tools is formed with two beveled faces which meet each other at somewhat more than right angles and intersect one of the side faces of the tool to provide two angularly disposed adjoining cutting edges. Each tool is so arranged in the cutter head that when operating upon the work one of its cutting edges is disposed substantially horizontally for the purpose of making a surface or leveling cut while the other cutting edge occupies an upright position slightly inclined to the vertical to produce a shoulder or depth cut disposed at somewhat more than right angles to the leveling cut.

In order that a rotary cutter head, provided with cutting tools or blades constructed and arranged as above described, shall function properly it is desirable that all of the blades shall be ground so that corresponding cutting edges shall be exactly alike in the several blades and shall bear the same angular relation with respect to the cutter head and shall be located in the same plane of rotation. Prior to the invention of W. C. Meyer, disclosed in United States Letters Patent No. 1,685,784, granted October 2, 1928, it was necessary that the blades of such cutters be removed from the cutter heads for grinding and presented individually to the grinding element, the grinding being manually controlled. This involved the laborious operations of disassembling the cutter heads to remove the blades and reassembling the cutter heads after the grinding. When the presentation of the blades to the grinding element was controlled manually it depended entirely upon the skill of the operative to produce the respective cutting edges. Not only was this a slow operation but even an expert who was able to grind one such blade with fair accuracy by manual control could not grind a second blade like the first one. By the invention disclosed in the application above referred to there was provided for the first time a rotary cutter of the type under consideration which was organized to make it practicable to grind by machine cutting tools or blades having a plurality of cutting edges formed by a plurality of beveled faces wthout removing the tools or blades from the cutter head, the novel cutter head organization described in said application being adapted for presentation as a unit for the grinding of the several blades.

With the foregoing in mind, one object of this invention is to provide an improved abrading machine adapted to receive a rotary cutter head, such as a cutter head of the type above referred to, in fully assembled condition and to operate upon the blades mounted therein in such a manner that all of the blades will have imparted to them similarly beveled faces arranged to provide a plurality of similar cutting edges having identically the same arrangement and angular disposition with respect to the cutter head.

To the accomplishment of this object, one feature of the present invention consists in the provision, in combination with an abrading element, of a work carrier adapted to receive an assembled rotary cutter head as a unit and to present each of the individual blades of the cutter head to the abrading element at a plurality of different angles for the purpose of producing or reproducing upon each blade a plurality of cutting edges disposed in a predetermined angular relation to each other. To this end, in the embodiment of the invention herein shown, the work carrier is movable in a path parallel to the axis of the grinding wheel to traverse the work across the periphery of the wheel and the cutter head is rotatably mounted upon the work carrier so that it can be turned relatively thereto to locate the several blades successively in position for presentment to the wheel, suitable locking means being provided for holding the cutter head in located positions.

In the illustrated cutter head each individual blade is arranged to be presented at an acute angle to the surface of the work and the cutting edges are formed by grinding or beveling the side of the tool which is opposed to the work. It will be apparent that the beveled face producing the substantially horizontal cutting edge must be disposed at such an angle to the longitudinal axis of the blade as to enable said cutting edge to engage and operate upon the work. In addition, the angle of bevel of this face should be such as to provide ample clearance between the surface of the leveling cut and the tool back of said cutting edge so as to insure that the tool will have a true cutting action instead of merely a scraping action upon the work. The degree of inclination of the beveled face which produces the depth or shoulder cut is equal to the angle between the blade and the curve of the shoulder cut at the cutting point plus an additional small angle to provide the necessary clearance to insure a cutting rather than a scraping action. The additional angle of bevel necessary to provide clearance such as that above described in connection with each cutting edge is hereinafter referred to as the "backing off" of the cutting edge. The work carrier is moved in a path parallel to the axis of the grinding wheel to effect the grinding and inasmuch as the beveled faces to be formed on the work must be inclined to the direction of movement of the work carrier in order to secure the desired backing off of the cutting edges, it will be evident that the blades cannot be ground in the cutter merely as a result of this simple movement of the work carrier to move the several blades successively across the periphery of the grinding wheel. Accordingly it is another object of this invention to provide for the grinding of the blades in a cutter head in such a way as to provide for the desired clearance between the cutting edges and the work.

To this end, and in accordance with another feature of the invention, the work carrier is movable into either of two predetermined positions relatively to the abrading element for the grinding of two cutting edges upon each blade, and means is provided to produce relative movement between the cutter head and the abrading element while the work carrier occupies either of the two positions for the purpose of securing the desired backing off of the cutting edges. As herein illustrated the relative movement for the purpose of producing the backing off of the cutting edge which makes the leveling cut is secured by a cam action resulting in axial displacement of the cutter head during the grinding operation while the work carrier is occupying one of the two predetermined positions relatively to the grinding element, and the relative movement for the purpose of backing off the other cutting edge is secured by an eccentric movement of the cutter head during grinding while the work carrier occupies the other predetermined position.

The invention further consists in the features of construction and in the combinations and arrangements of parts hereinafter described and claimed, the advantages of which will be apparent to those skilled in the art from the following description of the preferred embodiment of the invention illustrated in the accompanying drawings, in which:—

Fig. 1 is a side elevational view of a grinding machine constructed in accordance with the present invention and shows the cutter head with the companion blades mounted therein inserted in the machine as a unit;

Fig. 2 is a front elevational view of the mechanism shown in Fig. 1 with certain parts broken away, the better to illustrate the mounting of the central shaft within the work carrier;

Fig. 3 is a top plan view of mechanism with the work carrier moved into a position relatively to the grinding element for the production of one of the cutting edges;

Fig. 4 is a top plan view of the mechanism shown in Fig. 3 with certain parts broken away and the carrier moved into such a position relatively to the grinding element for the production of the second cutting edge;

Fig. 5 is a top plan view of the cutter head having the blades mounted therein;

Fig. 6 is a detail view in section of the locking mechanism employed in maintaining the carriage in a desired position relatively to the grinding element;

Fig. 7 is a side elevational detail view of a portion of the carrier with certain parts broken away, the better to illustrate the mounting of the central shaft;

Fig. 8 is a top plan view of the mechanism shown in Fig. 7;

Fig. 9 is an enlarged detail view of the cutting extremity of the blade showing the oppositely beveled faces that co-operate to produce the plurality of cutting edges;

Fig. 10 is a view in perspective showing the position of the blade relatively to the surface of the cutting block during the planing operation; and Fig. 11 is a detail view of a portion of the cutter head with a blade mounted therein during presentation to the grinding element.

As hereinbefore set forth, the illustrated cutter head (Fig. 5) is organized as disclosed in the co-pending Meyer application and is of a type in which any suitable number of cutting blades are mounted for use in performing a resurfacing operation upon a cutting block and the head is characterized by the fact that it is designed to be removed from the block planing device as a unit and mounted in the abrading machine while in its assembled form for operation upon each of the blades mounted therein. The cutter head comprises a central body portion and outwardly extending arms 14. Each arm 14 is formed with a sloping trough 16 disposed at an angle to the axis of the cutter head, and a V-shaped guideway 18 is located in the trough 16 to co-operate with a correspondingly shaped guideway 20 located in a clamping plate 22. By means of a stud bolt 24 that extends through the plate 22 and has screw threaded engagement with the arm 14, clamping pressure may be applied to the shank of a cutting blade 26 inserted within the co-operating guideways 18, 20 (Fig. 11).

The cutting blade 26, as best illustrated by Fig. 9, is made from a bar of steel, or other suitable material, rectangular in cross section and the cutting extremity of the blade is formed with oppositely beveled faces 32, 34 to provide a plurality of cutting edges 28 and 30 disposed in angular relation to each other and within a plane coinciding with one side of the rectangular bar. The purpose of providing the blade with a plurality of cutting edges and the benefit to be derived therefrom will be apparent from an inspection of Fig. 10 which illustrates in perspective the position the blade occupies relatively to the cutting block during the resurfacing operation and shows the edge 28 disposed in a substantially horizontal plane to produce a leveling cut while the second cutting edge 30 occupies a substantially vertical position to operate upon a side wall or shoulder 36 of the cut as the blade moves over the surface of the block. In order to permit a heel portion 38 of the cutting extremity of the blade to clear the side wall of the cut during the resurfacing operation and to reduce the frictional contact of the blade with the block to a minimum, the cutting edges are backed off or, in other words, the beveled faces 32 and 34 are ground at greater angles to the longitudinal axes of the blades than would be necessary merely to insure engagement of the cutting edges with the work. The result of this backing off process is best exemplified in Fig. 10 by the relation of an edge 40 of the blade to the wall 36 of the cut.

It has already been pointed out that the illustrated grinding machine is adapted to receive as a unit a cutter head having a plurality of cutting blades mounted within it and the machine is so constructed as to grind each of the blades in turn without the necessity of the operative disassembling the cutter head or repositioning it within the grinding machine when he has finished operating upon one blade and wishes to operate in turn upon another blade. To this end when the cutter head is inserted into the abrading machine, one of the cutting blades is locked in an operative position relatively to the abrading element 42 for the performing of the grinding operation and the cutter head may be rotated through an arc in such a manner that each of the remaining blades in turn may be moved into and locked in the position formerly occupied by the first blade for subjecting each of the remaining blades to a grinding operation similar to that performed upon the first blade. The body portion of the cutter head is formed with a centrally located threaded bore 44 which is adapted to receive the threaded forward extremity of a central shaft 46. This shaft 46 is mounted to rotate within a sleeve 48 which is mounted for rotation within a body portion 50 of a work carrier or holder. A collar 52 is rigidly mounted upon the rear extremity of the sleeve 48 by means of a clamping nut 54 and carries a circular flange member 56. This flange is formed with a number of depressions or indentations 58 equally spaced apart around its periphery and the number of indentations corresponds with the number of blades mounted within the cutter head, the purpose of which will presently be explained. A rear extremity 60 of the central shaft 46 extends beyond the end of the sleeve 48 and carries an operating handle 62 rigidly secured to the shaft by means of a clamping bolt 64. The outer extremity of the handle 62 is recessed to receive a spring pressed plunger 66 for removable engagement with any of the indentations 58 formed in the flange 56. Since the blades 26 mounted within the cutter head are equally disposed about the periphery of the head, and since the indentations in the flange 56 correspond in number and angular relation to the blades of the cutter head, it will be seen that by arranging the screw threaded engagement of the cutter head and central shaft in such a manner that one of the blades will be brought into operating registry with the grinding element 42 when the head is tightly screwed on the shaft, that the remaining blades may in turn be brought into registry with the grinding element by extracting the plunger 66 from the depression 58 which it engages and inserting it in turn into each of the remaining depressions. The screw threaded arrangement between the cutter head and shaft that causes one of the blades to be properly positioned when the head is screwed down on the shaft may be controlled by relative adjustment of the operating handle 62 and shaft 46 by means of the clamping screw 64.

For imparting a plurality of cutting edges to each blade during the grinding operation it is necessary that the cutting extremity of the blade be presented to the flat peripheral face of the disc shaped grinding element 42 in a plurality of angular relationships and to this end the work carrier or holder 50 is formed integral with a flat segmental base or seat portion 70 which is mounted to ride over a bed plate 68 for movement into either of a plurality of positions as exemplified by Figs. 3 and 4. The carrier base 70 slides over the bed plate 68 in an arcuate path and this sliding movement is controlled from a forwardly extending portion 74 (Fig. 1) of the base, the base 70 being pivotally secured to a forwardly extending arm 76 of the bed plate 68 about a pin 78. Adjustable stop screws 80 are carried by the base 70 and engage with a stop member 82 carried by the bed plate 68 to limit and control the extent of reciprocation of the carrier 50 about the pivot pin 78. It will be seen that by means of controlling the extent of reciprocation of the carrier the angles of presentation of the blade to the grinding element may be controlled to regulate, by a predetermined setting, the angular relation between the two cutting edges imparted to the blade. In addition to serving as a stop to limit the extent of movement of the carrier, the stop member 82 is also mounted on the bed plate 68 (Fig. 6) in such a manner that the operative, by manipulation of a clamping handle 84, may cause the stop 82 to move into frictional holding engagement with a rim 86 of the carrier base 70, to lock the carrier in any desired position relatively to the grinding element 42.

To provide for feeding of the work toward the grinding wheel to facilitate properly positioning the work prior to commencement of the grinding operation and to advance the work towards the grinding element as the cutting edge is ground away during the abrading operation, the following mechanism is provided. The bed plate 68, upon which is mounted the carrier 50, is provided on its under side with a projection in the form of a dovetail way 88. This way 88 has sliding dove-tail engagement with a guideway formed in a bed or body member 92 and lying at right angles to the axis of the grinding wheel 42. Movement of the way 88 within the guideway 90 causes movement of the work carrier toward or away from the grinder and control of this movement is effected by means of a downwardly depending flange or plate 94 (Figs. 1 and 2) rigidly mounted on the way 88 to provide a collar for a feed screw 96. This feed screw has screw-threaded engagement with the bed member 92, and since the plate 94 is prevented from longitudinal displacement relatively to the feed screw 96, it will be apparent from an inspection of Fig. 1 that any longitudinal movement imparted to the screw 96 will effect movement of the bed plate 68 and carrier 50 toward or away from the grinding element. A screw 98 provides means to lock the feed screw 96, and hence the bed plate 68, in any desired position relatively to the grinding element.

The machine is provided with means in addition to the above described feeding apparatus for moving the carrier entirely free of the abrading element to facilitate positioning a cutter head upon the extremity of the shaft 46. To this end the forward extremity of the bed member 92 is formed into a downwardly extending abutment 100 that rests upon a flat bearing plate 102 and the rear extremity of the bed is formed into downwardly and outwardly extending arms 104 that carry sleeve bearings 106 at their extremities. Arms 108 are secured to a portion 110 of the frame of the grinder by means of a shaft 112 and bolt 114 and extend rearwardly to form between their ends the bearing plate 102 and at their outer extremities a bearing 116. A bearing rod 118 is rigidly secured within the bearing 116 by means of a locking bolt 120 and the opposite ends of the bearing rod are inserted into the sleeve bearings 106 carried by the bed. From the foregoing description, and from an inspection of Fig. 1, it is apparent that the operative of the machine may, by grasping and exerting lifting pressure on the carrier 50, cause the carrier and bed to be freely swung about the bar 118 to assume a nearly vertical position, thereby moving the cutter head entirely clear of the grinder. It will further be seen from an inspection of Fig. 2 that the carrier and bed may be moved to the right of the position they occupy in that figure to traverse the cutter head across the periphery of the grinding element for presentation of the cutting blade to different portions of the grinder. By this arrangement the operative may present various blades to the periphery of the grinder at different points to cause uniform wearing down of the grinder.

From so much of the description as has already been given, it will be understood that the carrier may be moved to an out-of-the-way position for mounting the cutter head on the central shaft, and that each blade of the head may be presented to and fed towards the periphery of the grinder from first one and then the other of a plurality of directions to produce upon the blade a plurality of cutting edges lying at substantially a right angle to each other. The remaining portion of this description will relate to the manner in which the blade is moved across the periphery of the grinder during the abrading operation to produce backing off of the blade away from the cutting edge and at an angle to the longitudinal axis of the blade, the purpose of which backing off has already been explained.

The sleeve portion 48, within which the central shaft 46 is located, is bored off-center to form an eccentric mounting for the central shaft, the degree of eccentricity being clearly shown by the distance between center lines of the shaft and sleeve in Fig. 11. With the carrier occupying the angular position relatively to the grinding element as shown by Figs. 4, 8 and 11 and with the plunger 66 inserted in one of the depressions 58, one of the cutting blades 26 will be in registration with the grinder and since the central shaft is locked relatively to the sleeve, any degree of rotary movement imparted to the sleeve will be directly transferred to the central shaft, the cutter head and the blades, thereby causing the blade in registry with the abrading element to move upwardly or downwardly along the periphery of the abrading element. This rotary movement is effected by the operative grasping the handle 62 and oscillating it through an arc, the extent of oscillation being controlled by a cam roll 122 carried by a bolt 124 depending from the roof of the carrier body 50, and riding in a cam groove 126 (Fig. 8) formed in the surface of the collar 52. From an inspection of Figs. 8 and 11, it is apparent that if the shaft 46 were not eccentrically mounted the oscillation of the shaft would cause the blade 26 to move in an arc across the point of contact of the blade with the grinder, the radius of the arc being the distance from the center of the cutter head to the cutting extremity of the blade, and the face produced by the abrading operation would lie in a horizontal plane when the blade is mounted in the planer. However, in the actual operation of the device, the shaft being eccentrically mounted, the eccentricity comes into play as the blade edge 30 is moved upwardly along the periphery of the grinder and causes the blade to move inwardly towards the grinder during the upward movement to back off the ground face away from the edge 30, thus increasing the angularity of the face to the longitudinal axis of the blade.

To produce upon the second ground face a backing off similar to that produced on the first ground face, the cam groove 126 is formed to lie at such an angle relatively to the longitudinal axis of the shaft that the collar 52 moves forward during the upward movement of the cutting blade along the face of the grinder. When the carrier occupies the position shown in Figs. 4 and 8, this cam action moves the blade towards the face of the grinding element from an angle and produces sidewise movement of the blade across the peripheral face of the grinder, and, also in this position, the cam action cooperates with the eccentric action in producing the backing off during the abrading operation. When the carrier lies at right angles to the central axis of the grinder (Figs. 3 and 7) for the grinding of the horizontal cutting edge it will be seen that as the blade moves upwardly along the periphery of the grinder, the cam causes the shaft, cutter head and blade to move directly towards the abrading element to produce a backing off of the second cutting edge similar to that produced on the first blade. The eccentric movement of the shaft will have no effect during this operation on the second cutting edge other than to produce sidewise movement of the blade across the face of the grinder during the upward and inward movement of the blade.

Having thus described my invention, what I claim as new and desire to secure by Letters Patent of the United States is:—

1. In an abrading machine, an abrading element, and a work carrier adapted to receive a cutter-head having a plurality of cutting blades mounted in operative position therein and means for moving the work carrier relatively to the abrading element to present each of the blades mounted within the cutter head to the abrading element in such a manner that the abrading operation will impart to each blade a plurality of cutting edges lying at substantially right angles to each other.

2. In an abrading machine, an abrading element, a work carrier adapted to receive a cutter-head having a plurality of blades mounted therein, means to present one of the blades mounted within the head to the abrading element in such a manner that oppositely beveled faces will be imparted to the cutting extremity of the blade, and means to move a second blade into the position formerly occupied by the first blade and to present the second blade to the abrading element in exactly the same manner that the first blade was presented to produce upon the second blade the exact cutting extremity formerly produced upon the first blade.

3. In an abrading machine, an abrading element, and a carriage to receive and to support a cutter-head having a plurality of cutting blades mounted in operative position therein and movable into one position to present a blade to the abrading element at a predetermined angular displacement for producing a first cutting edge and movable into a second position to present the same blade to the abrading element at a second and different angular displacement for producing a second cutting edge on the blade.

4. In an abrading machine, an abrading element, a carrier adapted to receive a cutter-head having a plurality of blades mounted in operative position therein, means to present one of the cutting blades to the element in such a manner that a plurality of cutting edges will be imparted to the blade and means to present each of the remaining blades in turn to the abrading element to reproduce upon each the exact plurality of cutting edges formerly produced upon the first.

5. An abrading machine comprising a work carrier adapted to position the blades of an operatively assembled rotary cutter head for the operation thereon of a grinding element, and means to produce relative movement of the work carrier and the grinding element to impart to the blades a plurality of predetermined cutting edges.

6. In an abrading machine for operating upon the blades of an operatively assembled rotary cutter, an abrading element, a pivotally mounted work carrier, and means to present the blades to the abrading element in such a manner that a plurality of cutting edges lying at a predetermined angular relation to each other will be imparted to each blade during the abrading operation.

7. In an abrading machine for operating upon the blades of an assembled rotary cutter head, an abrading element, a work support adapted to receive the cutter head in any of a plurality of positions within the work support so that each blade mounted therein may be presented in turn to the grinding element, and means to present each blade to the grinding element in such a manner that a cutting face backed off at an angle to the longitudinal axis of the blade will be imparted thereto during the abrading operation.

8. In an abrading machine for operating upon a cutting blade, an abrading element, a work holder mounted for movement into either of two fixed positions relatively to the abrading element in one of which it is adapted to impart to the blade a straight line cutting edge and in the other of which it is adapted to impart to the blade a second straight line cutting edge lying in predetermined angular relation to the first cutting edge.

9. In an abrading machine, an abrading element, a pivotally mounted work carrier to receive a cutting blade and to present it to the abrading element for imparting to the blade a plurality of cutting edges lying within the same plane at an angle to each other, the angular relation between the cutting edges being dependent upon the pivotal movement of the carrier.

10. In an abrading machine for operating upon a cutting blade, an abrading element, a carrier for the blade mounted to pivot between either of two positions relatively to the abrading element for presenting the blade to the abrading element to impart to the blade a plurality of predetermined angularly displaced cutting edges lying within the same plane, and means to vary and to control the extent of pivotal movement of the carrier to vary and to control the predetermined angular relationship existing between the cutting edges of the blade.

11. In an abrading machine for operating upon a cutting blade, a work carrier to receive the blade and to present the blade to the abrading element in such a manner that a plurality of straight line cutting edges lying at predetermined angular relationship to each other will be produced upon the cutting blade, means to vary and to control the predetermined angular relationship of the cutting edges, and means to move the cutting blade from the abrading element during the abrading operation for backing off the cutting extremity of the blade at an angle to the longitudinal axis of the blade.

12. In an abrading machine, an abrading element, and a carrier adapted to receive and to support a cutting blade, means to move the blade upwardly along the peripheral face of the abrading element during the abrading operation, and means to move the cutting blade inwardly toward the abrading element during the upward movement.

13. In an abrading machine, an abrading element, means to support a cutting blade, means for moving the cutting blade in one direction along the face of the abrading element, means for moving the blade in a second direction relatively to the abrading element, the resultant of the two movements controlling the cutting edge imparted to the blade during the abrading operation.

14. In an abrading machine for operating upon the blades of an assembled rotary cutter head, an abrading element, a work carrier, means to position fixedly the cutter head within the carrier in such a manner that one of the blades mounted within the head may be presented to the abrading element for the grinding operation, means to permit the rotary cutter head to be fixedly positioned within the work support in such a manner that another blade mounted within the head may occupy the exact position occupied by the first blade for presentation to the abrading element, and means to impart to each of the blades so presented a plurality of cutting edges lying at a predetermined angular relationship to each other.

15. In an abrading machine for operating upon the blades of an assembled rotary cutter head, an abrading element, means for presenting one of the blades to the abrading element from first one and then the other of a plurality of directions, and means for changing the position of the blades relatively to the abrading element and to permit a second blade to be presented to the abrading element in the exact manner in which the first was presented.

16. In an abrading machine for operating upon the blades of an assembled rotary cutter head, an abrading element, a work holder adapted to support the head in such a manner as to permit one of the blades to be presented to the abrading element for imparting to the blade a plurality of cutting edges having a predetermined backing off, and means to vary the position of the cutter head within the work holder to enable a second blade to be presented to the abrading element and to produce upon the second blade the exact cutting edges and backing off formerly produced upon the first.

17. In an abrading machine for operating upon the blades of an assembled rotary cutter head, an abrading element, a carrier located in proximity to the abrading element and mounted to pivot about a first axis for presenting the blades to the abrading element from either of a plurality of directions and pivotal about a second axis for moving the carrier entirely clear of the abrading element.

18. In an abrading machine, an abrading element, a shaft to carry the abrading element, a work carrier, feeding mechanism for moving the carrier toward and away from the abrading element, and a pivotal mounting for the carrier to permit the carrier to be moved about an axis parallel to said shaft into a position entirely clear of the abrading element.

19. In an abrading machine, a work carrier mounted to pivot about one axis to present the work to the abrading element from either of a plurality of positions and pivotal about a second axis lying at right angles to the first to move the carrier between either an operative or inoperative position.

20. In an abrading machine, an abrading element, a carrier mounted to pivot about an axis lying parallel to the central shaft of the abrading element for movement between an operative or inoperative position and for movement along the axis to present the supported work to any desired portion of the periphery of the abrading element.

21. In an abrading machine, a work carrier, a shaft within the carrier, means to mount a cutter head containing a plurality of blades upon the shaft, means to oscillate the shaft to oscillate the cutter head, and a cam to effect longitudinal movements of the shaft through the carrier during the oscillatory movements and to control the extent of oscillation of the shaft.

22. In an abrading machine, an abrading element, a work carrier for supporting a cutter head having a plurality of blades mounted therein, a shaft eccentrically mounted within the carrier, and means to oscillate the shaft within the carrier to traverse the blades mounted within the cutter head along the face of the abrading element.

23. In an abrading machine, an abrading element, means to receive and support a cutting blade, means to oscillate the cutting blade along the face of the abrading element, means to impart eccentric motion to the blade during the oscillatory motion, and a cam to impart movement to the blade during the oscillatory motion.

24. In an abrading machine, an abrading element, a support for a cutter blade, means to permit oscillatory movement to be imparted to the blade during the abrading operation, means to impart cam action to the blade during the oscillations to cause the blade to move across the face of the abrading element during the abrading operation, and means to impart eccentric motion to the blade during the oscillations to cause the blade to be backed off at an angle to its longitudinal axis during the abrading operation.

25. In an abrading machine, an abrading element and an eccentrically mounted cam-controlled work support constructed and arranged to present the work to the abrading element in such a manner as to produce upon the work a plurality of cutting edges formed by the intersection of oppositely beveled backed off faces with a single side face of the work.

In testimony whereof I have signed my name to this specification.

AUGUSTUS D. WILLHAUCK.